United States Patent
Whitehouse et al.

(10) Patent No.: US 6,197,848 B1
(45) Date of Patent: *Mar. 6, 2001

(54) POLYMERIC COMPOSITIONS

(75) Inventors: Robert S. Whitehouse, Lexington, MA (US); Thomas F. Reed, Alpharetta, GA (US)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,796

(22) Filed: Feb. 17, 1998

Related U.S. Application Data

(62) Division of application No. 08/563,283, filed on Nov. 22, 1995, now Pat. No. 5,747,559.

(51) Int. Cl.$^7$ ....................................... C08K 3/04
(52) U.S. Cl. .................. 523/205; 523/215; 523/351; 524/424; 524/521; 524/524; 524/566; 524/495; 428/380; 428/383
(58) Field of Search ..................... 523/205, 215, 523/351; 524/424, 521, 524, 566; 428/380, 383

(56) References Cited

U.S. PATENT DOCUMENTS

| | | |
|---|---|---|
| 3,959,558 | 5/1976 | MacKenzie, Jr. . |
| 4,400,580 * | 8/1983 | Yamanouchi .................. 428/383 |
| 4,412,938 * | 11/1983 | Kakizaki et al. .................. 524/504 |
| 4,451,536 | 5/1984 | Barlow et al. . |
| 5,416,155 | 5/1995 | Aladenize et al. . |
| 5,426,136 * | 6/1995 | Waddell et al. .................. 523/205 |
| 5,725,650 | 3/1998 | Flenniken et al. .................. 427/220 |
| 5,747,563 | 5/1998 | Flenniken et al. .................. 523/215 |

FOREIGN PATENT DOCUMENTS

| | | |
|---|---|---|
| 0 578 245 A2 | 1/1994 | (EP) .................. C08K/3/04 |
| WO 96/29710 | 9/1996 | (WO) . |
| WO 97/19132 | 5/1997 | (WO) . |

OTHER PUBLICATIONS

Copy of PCT Notification of Transmittal of the International Search Report or the Declaration.
PCT International Search Report.
International Search Report for PCT/US96/03558.
International Search Report for PCT/US96/18482.
U.S. Patent Application Serial No. 08/563,328; filed Nov. 22, 1995 (see WO 97/19132).
U.S. Patent Application Serial No. 08/980,279; filed Nov. 28, 1997 (see WO 96/29710).

* cited by examiner

*Primary Examiner*—Andrew E. C. Merriam

(57) ABSTRACT

A composition comprising an ethylene containing polymer, a crosslinking agent and a treated filler material. The treated filler material comprises a treating agent which is a polymer comprising acrylonitrile and at least one other monomer. A preferred treated filler material is a treated carbon black and a preferred ethylene containing polymer is an ethylene vinyl acetate (EVA) polymer. A semiconductive composition of the present invention may be advantageously utilized in electrical wire and cable application.

10 Claims, No Drawings

POLYMERIC COMPOSITIONS

This application is a division of application Ser. No. 08/563,283, filed Nov. 22, 1995, now U.S. Pat No. 5,747, 559.

FIELD OF THE INVENTION

The present invention relates to a composition comprising a treated filler material, preferably a treated carbonaceous filler material, a crosslinking agent and an ethylene containing polymer. A preferred treated filler material comprises carbon black and preferred ethylene containing polymers are ethylene-vinyl acetate (EVA), ethylene-propylene (EPR) and ethylene propylene diene monomer (EPDM).

BACKGROUND OF THE INVENTION

The treating of carbon black with polymeric binders is disclosed in the art. Previous patents disclose the art of incorporating additives to produce pelletized treated filler materials, in particular pelletized treated carbon blacks, with improved handling characteristics, for example, low dust.

The construction of insulated electrical conductors, i.e., wire and cables designed for medium and high voltage applications, is known in the art. Typical constructions include a core conductor which comprises one or more strands of a conducting metal or alloy such as copper or aluminum; a layer of a semiconductive shielding compound; a layer of insulation such as crosslinked polyethylene or ethylene-propylene rubber and a layer of a semiconductive insulation shield compound overlaying the insulation.

The conductor shield, the insulation shield and the overlaying semiconductive shield layer may be formed by either a two pass or by a single pass triple extrusion process. A two pass operation refers to a process whereby the conductor shield and the insulation layer are extruded in tandem and then crosslinked prior to extrusion of the semiconductor insulation layer. A single pass triple extrusion process refers to a process in which the conductor shield, the insulation layer and the semiconductive shield are all extruded in a common extrusion head and crosslinked simultaneously. The single pass triple extrusion process minimizes production steps and hence is a preferred method of manufacture. However, the single pass triple extrusion process generally makes the semiconductive shield layer more fully bonded to the insulation layer, than in a two pass operation.

Generally, in order to splice insulated electrical wires, or make terminal connections, the semiconductive shield layer should be stripped from the insulation layer. Stripping the semiconductive shield layer from the insulation shield layer is often very difficult. In a situation where the semiconductive shield layer contains carbon black, a carbon containing residue on the surface of the insulation shield often results. The carbon residue may disadvantageously promote treeing in the insulation layer which will ultimately lead to electrical breakdown of the cable. It is therefore advantageous and desirable for a semiconductive shield layer to have a low strip force (be easily separable) when being removed from the insulation layer and for the semiconductive shield layer to leave minimal amounts of carbon residue on the surface of the insulation shield.

Strippable conductive shield compositions are those which can be separated from a crosslinked insulation layer without leaving appreciable amounts of residue on the insulation layer. Usually, the force required to separate a strippable conductive shield composition is significantly lower than the separation force required for bonded shield compositions.

There is a significant cost difference between strippable and bonded semiconductive shield compositions based on existing technological approaches. It would be advantageous, to produce more cost effective strippable formulations than those developed from the technical approaches utilized to date.

SUMMARY OF THE INVENTION

The present invention provides a composition comprising:

25–75%, by weight, based on the total weight of the composition, of an ethylene containing polymer;

24–74%, by weight, based on the total weight of the composition, of a treated filler material; and 1–10%, by weight, based on the total weight of the composition, of a crosslinking agent;

wherein the treated filler material comprises 0.05–40%, by weight, based on the weight of the treated filler material, of a treating agent, and said treating agent is a polymer comprising acrylonitrile and at least one monomer selected from butadiene, isoprene, ethylene, propene, butene, hexene, octene, styrene, vinyl toluene, alpha methyl styrene, vinylidene chloride, vinyl chloride, acrylic acid, a $C_1$–$C_8$ alkyl ester of acrylic acid, methacrylic acid, or a $C_1$–$C_8$ alkyl ester of methacrylic acid; with acrylonitrile comprising 0.5–55%, by weight, based on the weight of the treating agent.

Preferably the ethylene containing polymer is: an ethylene vinyl acetate (EVA) polymer, ethylene propylene rubber (EPR) or ethylene propylene diene monomer (EPDM). More preferably, the ethylene containing polymer is an EVA polymer wherein the EVA polymer comprises 16–55%, by weight, based on the weight of the EVA polymer of a vinyl acetate monomer. A preferred treated filler material is a treated carbonaceous material, more preferably a treated carbon black. A preferred treating agent comprises: acrylonitrile and butadiene. More preferably, the treating agent comprises an acrylonitrile butadiene, or a carboxylated acrylonitrile butadiene polymer containing 20–55%, by weight, based on the weight of the treating agent, of an acrylonitrile monomer. Preferred crosslinking agents are an organic peroxide, such as dicumyl peroxide, sulfur, or a sulfur donor system. A preferred composition of the present invention is semiconductive.

The present invention also includes an article of manufacture produced utilizing the composition of the present invention. A preferred article of manufacture is cable insulation comprising a semiconductive composition of the present invention bonded to an insulation layer, wherein the insulation layer preferably includes an ethylene homopolymer or copolymer.

An advantage of the compositions of the present invention which are semiconductive is that the semiconductive compositions may be utilized as strippable semiconductive shield compositions in wire and cable insulation applications.

Further details and advantages of the present invention are set forth in the following more detailed description.

DETAILED DESCRIPTION OF THE INVENTION

According to the present invention, a composition comprises:

25–75%, by weight, based on the total weight of the composition, of an ethylene containing polymer;

24–74%, preferably 30–45%, by weight, based on the total weight of the composition, of a treated filler material; and 1–10%, preferably 1–6%, by weight, based on the total weight of the composition, of a crosslinking agent;

wherein the treated filler material comprises 0.05–40%, preferably 0.5–20%, more preferably 4–15%, by weight, based on the weight of the treated filler material, of a treating agent, and said treating agent is a polymer comprising acrylonitrile and at least one monomer selected from: butadiene, isoprene, ethylene, propene, butene, hexene, octene, styrene, vinyl toluene, alpha methyl styrene, vinylidene chloride, vinyl chloride, acrylic acid, a $C_1$–$C_8$ alkyl ester of acrylic acid, methacrylic acid, or a $C_1$–$C_8$ alkyl ester of methacrylic acid; with acrylonitrile comprising 0.5–55%, preferably 20–55%, more preferably 30–45%, by weight, based on the weight of the treating agent.

The ethylene containing polymer of the composition of the present invention is preferably: an ethylene vinyl acetate (EVA) polymer, ethylene propylene rubber (EPR) or ethylene propylene diene monomer (EPDM). More preferably, the ethylene containing polymer is an EVA polymer wherein the EVA polymer comprises 16–55%, preferably 18–45%, by weight, based on the weight of the EVA polymer of a vinyl acetate monomer.

A preferred treated filler material is a treated carbonaceous material, more preferably a treated carbon black. A preferred treating agent comprises: acrylonitrile and butadiene. More preferably, the treating agent comprises an acrylonitrile butadiene, or carboxylated acrylonitrile butadiene polymer containing 20–55%, by weight, based on the weight of the treating agent, of an acrylonitrile monomer.

Preferred crosslinking agents are an organic peroxide, such as dicumyl peroxide, sulfur, or a sulfur donor system.

A preferred composition of the present invention is semiconductive.

The composition of the present invention may include other conventional additives such as coagents, processing additives, hydrocarbon oils, stabilizers, accelerators, antioxidants, curing agents, vinyl silane and the like. Preferably the composition is curable.

The compositions of the present invention may be produced in any manner known to the art for combining polymers and particulate components. A preferred method for producing the compositions of the present invention is compounding using a batch or continuous mixer such as a Banbury mixer, Twin Screw extruder or Buss kneader. The compositions of the present invention may be cured in manners conventional in the art.

A treated filler material comprises a filler material and a treating agent. Suitable filler materials for use in the composition of the present invention include, but are not limited to, carbonaceous filler materials such as carbon black and graphite, and metal oxides such as silica.

A preferred filler material for use in the present invention is a carbonaceous material, more preferably carbon black. The carbon black may be any carbon black such as a furnace carbon black, a thermal carbon black, an acetylene black, and a carbon black produced by a gasification process. While any carbon black may be utilized in the compositions of the present invention, preferably the carbon black component of the treated filler material has an iodine number ($I_2$No.) of 10 to 1800 mg/g, preferably 18 to 250 mg/g, and a fluffy dibutyl phthalate absorption value (DBP) of 40 to 350 cc/100 g, preferably 90 to 180 cc/100 g.

A preferred treated filler material is a carbon black treated with 0.05% to 40%, preferably 0.5% to 20%, and more preferably 4% to 15%, by weight, based on the weight of the treated carbon black, of a treating agent, wherein the treating agent comprises a polymer comprising acrylonitrile and at least one monomer selected from: butadiene, isoprene, ethylene, propene, butene, hexene, octene, styrene, vinyl toluene, alpha methyl styrene, vinylidene chloride, vinyl chloride, acrylic acid, a $C_1$–$C_8$ alkyl ester of acrylic acid, methacrylic acid, or a $C_1$–$C_8$ alkyl ester of methacrylic acid; with acrylonitrile comprising 0.5–55%, preferably 20–55%, more preferably 30–45%, by weight, based on the weight of the treating agent. A preferred treating agent comprises: acrylonitrile and butadiene. More preferably, the treating agent comprises an acrylonitrile butadiene or carboxylated acrylonitrile butadiene polymer containing 20–55%, more preferably 30–45%, by weight, based on the weight of the treating agent, of an acrylonitrile monomer.

A treated filler material suitable for use in the compositions of the present invention may be produced in any manner known in the art, such as by physically blending the components, melt mixing the components or combining the components while pelletizing the filler. The treated filler material may be produced, in dry form, by a conventional pelletizing process. For example, treated filler material for use in the compositions of the present invention may be produced by contacting a filler, e.g. a fluffy carbon black, in a pin pelletizer with an aqueous dispersion containing a treating agent to form wet pellets and then heating the wet pellets under controlled temperature and time parameters such that the water is removed from the pellets without the treating agent undergoing substantial decomposition.

Pin pelletizers which may be utilized to produce a treated filler material for use in compositions of the present invention are known in the art and include the pin pelletizer described in U.S. Pat. No. 3,528,785, the disclosure of which is hereby incorporated by reference. U.S. Pat. No. 3,528,785 also describes a conventional pelletizing process which may be utilized to produce a treated filler material for use in the compositions of the present invention.

The present invention also includes an article of manufacture produced utilizing the composition of the present invention. A preferred article of manufacture is an extruded article, such as a profile, tube, tape or film. Also preferred as an article of manufacture of the present invention is a medium, or high, voltage cable comprising:

a metal conductor core;

a semiconductive shield;

an insulation layer; and an outer semiconductive layer, wherein a semiconductive composition of the present invention is utilized in the semiconductive shield and/or the outer semiconductive layer. The articles of manufacture of the present invention may be produced using conventional techniques utilized by those of ordinary skill in the art.

The effectiveness and advantages of various aspects and embodiments of the present invention will be further illustrated by the following examples wherein the following testing procedures were utilized.

The following testing procedures were utilized in the determination and evaluation of the analytical properties of the carbon blacks utilized in the following examples. The DBP (dibutyl phthalate adsorption value) of the carbon blacks utilized in the examples, expressed as cubic centimeters DBP per 100 grams carbon black (cc/100 g), was determined according to the procedure set forth in ASTM D2414. The Iodine number ($I_2$No.) of the carbon blacks utilized in the examples, expressed as milligrams per gram (mg/g), was determined according to ASTM test procedure D1510.

The peel force was determined by producing a plaque of the composition utilizing a heated hydraulic press (temperature 130° C.) to produce 1.2 millimeters (mm) thick plaque. A 2 mm thick polyethylene plaque containing 1% dicumyl peroxide was produced in a similar manner. The two plaques were laminated together under a pressure of 100 psi and exposed to a curing cycle of 180° C. for 15 minutes. The resulting laminate was allowed to cool to ambient temperature under pressure. The strip force required to delaminate the composition layer from the polyethylene layer, at a peeling angle of 180° and a separation speed of 3.94 inches/minute was recorded as peel force. The error of the test is typically +/−0.1 lb/0.5 in.

EXAMPLES

Fourteen compositions, A–N, were produced utilizing two carbon blacks, CB1 and CB2, as filler material. Carbon blacks CB1 and CB2 had the properties set forth in Table 1 below.

| Carbon Black | Iodine No. mg/g | Fluffy DBP cc/100 g |
|---|---|---|
| CB1 | 68 | 140 |
| CB2 | 20 | 131 |

Compositions B, C, E, G, I, K, L, M and N were examples of compositions of the present invention and were produced utilizing a treated carbon black comprising carbon black and HYCARS® 1571 a carboxylated acrylonitrile butadiene latex polymer produced and sold by BF Goodrich, Akron, Ohio.

Compositions A, D, F, H and J were control compositions produced utilizing untreated carbon black pellets.

The treated carbon blacks utilized in compositions B, C, E, G, I, K, L, M and N, were produced by combining fluffy carbon black with HYCAR® 1571 a carboxylated acrylonitrile butadiene latex polymer and water, to form wet pellets, in a continuous pin pelletizer. The control carbon black pellets utilized in compositions A, D, F, H and J were produced in similar fashion except without addition of any treating agent. The resultant wet pellets were dried at a temperature which was sufficient to remove the water without causing decomposition of the polymer. In these experiments, drying temperatures in the range of 120° C. to 180° C. were found to be acceptable.

The compositions were produced using a Banbury mixer by compounding the carbon black pellets with ELVAX EVA resins (manufactured and sold by DuPont, Wilmington, Del.) to produce compositions comprising 40–42%, by weight, based on the weight of the composition, carbon black, 0.5%, by weight, based on the weight of the composition, AGERITE MA antioxidant (manufactured and sold by R. T. Vanderbilt Company Inc., Norwalk, Conn.), 1.0%, by weight, based on the weight of the composition, VUL-CUP R peroxide curing agent (manufactured and sold by Hercules Inc., Wilmington, Del.) with the remainder of the compositon being EVA resin and treating agent. The mixing temperature was maintained below 150° C. to minimize premature cure of the compound.

The peel force of each composition was then determined utilizing the procedure described above. The results are provided in Table 2 below

TABLE 2

| Composition | Carbon Black | Treating Agent %, by weight* | Carbon Black Loading %, by weight † | ELVAX EVA Resin Grade | Peel Force lb/0.5 in |
|---|---|---|---|---|---|
| A | CB1 | 0 | 42 | 265 | 9.9 |
| B | CB1 | 1 | 42 | 265 | 7.5 |
| C | CB1 | 4 | 42 | 265 | 6.2 |
| D | CB1 | 0 | 45 | 265 | 7.7 |
| E | CB1 | 1 | 45 | 265 | 6.8 |
| F | CB1 | 0 | 40 | 170 | 3.6 |
| G | CB1 | 2 | 40 | 170 | 2.2 |
| H | CB1 | 0 | 40 | 40L03 | 2.8 |
| I | CB1 | 2 | 40 | 40L03 | 2.1 |
| J | CB2 | 0 | 40 | 40L03 | 2.9 |
| K | CB2 | 0.5 | 40 | 40L03 | 2.8 |
| L | CB2 | 1 | 40 | 40L03 | 2.8 |
| M | CB2 | 2 | 40 | 40L03 | 2.6 |
| N | CB2 | 4 | 40 | 40L03 | 2.3 |

*The treating agent %, by weight, based on the weight of the treated carbon black.
†The carbon black loading %, by weight, based on the weight of the composition.
Treating agent = HYCAR ® 1571 acrylonitrile butadiene polymer latex These results show the reduced peel force of the compositions of the present invention (B, C, E, G, I, K, L, M and N) resulting from the use of the treated carbon blacks. This effect is noticeable for different levels of treating agent and in different EVA resins.

It should be clearly understood that the forms of the present invention herein described are illustrative only and are not intended to limit the scope of the invention.

What is claimed is:

1. An article of manufacture formed from a composition comprising:
   25–75%, by weight, based on the total weight of the composition, of an ethylene containing polymer;
   24–74%, by weight, based on the total weight of the composition, of a treated filler material; and
   1–10%, by weight, based on the total weight of the composition, of a crosslinking agent;
   wherein the treated filler material comprises 0.05–40%, by weight, based on the weight of the treated filler material, of a treating agent, and said treating agent is a polymer comprising acrylonitrile and at least one monomer selected from: butadiene, isoprene, ethylene, propene, butene, hexene, octene, styrene, vinyl toluene, alpha methyl styrene, vinylidene chloride, vinyl chloride, acrylic acid, a $C_1$–$C_8$ alkyl ester of acrylic acid, methacrylic acid, and a $C_1$–$C_8$ alkyl ester of methacrylic acid; with acrylonitrile comprising 0.5–55%, by weight, based on the weight of the treating agent wherein the article is a cable.

2. The article of manufacture of claim 1 wherein the ethylene containing polymer is an ethylene vinyl acetate (EVA) polymer wherein the EVA polymer comprises 16–55%, by weight, based on the weight of the EVA polymer of a vinyl acetate monomer.

3. The article of manufacture of claim 1 wherein the composition is a semiconductive composition and the article of manufacture is an electric cable comprising:
   a metal conductor core;
   a semiconductive shield;
   an insulation layer; and
   an outer semiconductive layer,
   wherein the composition is utilized in at least one of: the semiconductive shield or the outer semiconductive layer.

4. The article of manufacture of claim 3 wherein the composition is directly bonded to the insulation layer and the insulation layer comprises an ethylene homopolymer or copolymer.

5. An article of manufacture formed from a composition comprising:
- 25–75%, by weight, based on the total weight of the composition, of an ethylene containing polymer;
- 24–74%, by weight, based on the total weight of the composition, of a treated carbonaceous material; and
- 1–10%, by weight, based on the total weight of the composition, of a crosslinking agent;

wherein the treated carbonaceous material comprises 0.05–40%, by weight, based on the weight of the treated carbonaceous material, of a treating agent, and said treating agent is a polymer comprising acrylonitrile and at least one monomer selected from: butadiene, isoprene, ethylene, propene, butene, hexene, octene, styrene, vinyl toluene, alpha methyl styrene, vinylidene chloride, vinyl chloride, acrylic acid, a $C_1$–$C_8$ alkyl ester of acrylic acid, methacrylic acid, and a $C_1$–$C_8$ alkyl ester of methacrylic acid; with acrylonitrile comprising 0.5–55%, by weight, based on the weight of the treating agent.

6. The article of manufacture of claim 5 wherein the ethylene containing polymer is an ethylene vinyl acetate (EVA) polymer wherein the EVA polymer comprises 16–55%, by weight, based on the weight of the EVA polymer of a vinyl acetate monomer.

7. The article of manufacture of claim 5 wherein the article is a cable.

8. The article of manufacture of claim 5 wherein the article is an extruded article selected from the group consisting of: a profile, a tube, a tape, and a film.

9. The article of manufacture of claim 5 wherein the composition is a semiconductive composition and the article of manufacture is an electric cable comprising:
- a metal conductor core;
- a semiconductive shield;
- an insulation layer; and
- an outer semiconductive layer, wherein the composition is utilized in at least one of: the semiconductive shield or the outer semiconductive layer.

10. The article of manufacture of claim 9 wherein the composition is directly bonded to the insulation layer and the insulation layer comprises an ethylene homopolymer or copolymer.

* * * * *